United States Patent [19]
Schliebe et al.

[11] Patent Number: 5,957,547
[45] Date of Patent: *Sep. 28, 1999

[54] ABS VALVE BODY HEAT SINK FOR CONTROL MODULE ELECTRONICS

[75] Inventors: Paul M. Schliebe, Dexter; Ernest S. Blazic, Ypsilanti, both of Mich.

[73] Assignee: Kelsey-Hayes Company, Livonia, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/796,758

[22] Filed: Feb. 6, 1997

Related U.S. Application Data

[60] Provisional application No. 60/011,258, Feb. 7, 1996, and provisional application No. 60/011,277, Feb. 7, 1996.

[51] Int. Cl.⁶ .................................................. B60T 8/36
[52] U.S. Cl. ............................ 303/119.3; 303/DIG. 10
[58] Field of Search ........................ 303/113.1, 116.4, 303/119.2, 119.3; 364/622

[56] References Cited

U.S. PATENT DOCUMENTS

| 3,586,102 | 6/1971 | Gilles . |
| 5,040,853 | 8/1991 | Burgdorf et al. . |
| 5,386,337 | 1/1995 | Schoettl ............................ 303/119.3 |
| 5,513,905 | 5/1996 | Zeides et al. ..................... 303/119.3 |
| 5,688,028 | 11/1997 | Kohno et al. ..................... 303/116.4 |
| 5,785,394 | 7/1998 | Volpe et al. ....................... 303/119.3 |
| 5,853,231 | 12/1998 | Iwamura et al. .................. 303/119.3 |

*Primary Examiner*—Matthew C. Graham
*Attorney, Agent, or Firm*—MacMillan, Sobanski & Todd, LLC

[57] ABSTRACT

A hydraulic valve body for an electro-hydraulic control unit forms a heat sink for the control unit electronic components. The control unit can be included in an anti-lock brake system.

18 Claims, 3 Drawing Sheets

ABS VALVE BODY HEAT SINK FOR CONTROL MODULE ELECTRONICS

CROSS REFERENCE TO RELATED APPLICATIONS

This application claims the benefit of U.S. Provisional Application No. 60/011,258, filed Feb. 7, 1996, and U.S. Provisional Application No. 60/011,277, filed Feb. 7, 1996.

BACKGROUND OF THE INVENTION

This invention relates in general to electronic control modules for anti-lock brake systems and in particular to a heat sink for dispersion of the heat generated by the electronic components included in the control modules.

An Anti-lock Brake System (ABS) is often included as standard equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an electronic control module which has a microprocessor. The control module is electrically coupled to the pump motor, a plurality of solenoid coils associated with the solenoid valves and wheel speed sensors for monitoring the speed and deceleration of the controlled wheels. The control module is typically mounted upon the control valve body to form a compact unit which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

The ABS control module typically includes electronic components in addition to the microprocessor which function as actuators for the solenoid valves in the control valve and switching circuits for cycling the pump motor on and off. It is desirable to use discrete electronic components and/or multi-chip hybrid devices which do not have discrete leads but are surface mounted upon a control circuit substrate, such as a printed circuit board or a ceramic substrate. Surface mounting achieves a higher packaging density of the electronic components and/or devices within the control module. This allows a reduction in the overall size of the control module.

The currents drawn through the electronic components in the control module by the pump motor and the solenoid valve windings can be large. Accordingly, many of the electronic components are selected to have high power ratings. During operation of the ABS, the internal resistances of the electronic components generate heat which is transferred to the circuit substrate. The amount of heat generated typically exceeds the capacity of the substrate to dissipate the heat. Thus, additional thermal mass is usually required to assure reliable operation of the control module. Accordingly, a die cast or wrought aluminum heat sink is typically bonded to the control circuit substrate with a thermally conductive adhesive. The adhesive secures the circuit substrate to the heat sink and forms an interface which provides a low thermal resistance path therebetween.

SUMMARY

This invention relates to an improved ABS control valve having the valve body as a heat sink for the electronic components in the ABS electronic control module.

As described above, prior art ABS electronic control modules typically include control circuitry comprising electronic components mounted upon a ceramic or PCB circuit substrate. The circuit substrate is bonded to a die cast or wrought aluminum heat sink with a layer of thermally conductive adhesive. The control circuit and heat sink are enclosed within a control module housing.

ABS hydraulic pump motor power switching devices are typically included in the control circuit and reside on the same heat sink as other ABS electronics logic and/or power devices. The pump motor typically draws large currents through the switching devices causing generation of a significant amount of heat in the devices. Accordingly, the ABS electronics module heat sink must have a sufficiently large volume to dissipate the total heat generated by the electronic components and the hydraulic pump motor switching devices during ABS braking cycles.

It would be desirable to provide an alternate heat sink to dissipate the heat generated by the electronic components and the pump motor switching devices. The present invention utilizes the control valve body as a heat sink for the control module electronic components.

The present invention contemplates a control valve for a hydraulic control system which includes a control valve body having an exterior surface and a control circuit substrate disposed adjacent to the exterior surface of the control valve body. The substrate carries electronic components adapted to control components of the hydraulic control system and forms a thermal interface with the exterior surface of the valve body. The valve body then functions as a heat sink for the electronic components. A thermally conductive material can be disposed between the circuit substrate and the valve body.

The invention further contemplates that a housing having a recess formed therein is mounted upon said valve body with the recess receiving the substrate. The housing cooperates with the substrate to urge the substrate against the valve body surface. The housing can be the control module housing or the pump motor mounting flange. When the pump motor mounting flange is used for the housing, the recess is formed in the flange and the invention contemplates locating the electronic control components for the pump motor within the flange recess.

The invention also contemplates insert molding a lead frame within the housing. The lead frame electrically couples the electronic components mounted upon the substrate to other electrical components. Additionally, a spreader, which can include a heat sink, can be molded into the housing. The spreader carries the substrate. A first layer of thermally conductive material can be disposed between the substrate and the spreader and a second layer of thermally conductive material can be disposed between the spreader and the valve housing.

Various advantages of the invention will become apparent from the following detailed description of the invention when read in combination with the accompanying drawings.

DETAILED DESCRIPTION OF THE PREFERRED EMBODIMENT

Figure 1:
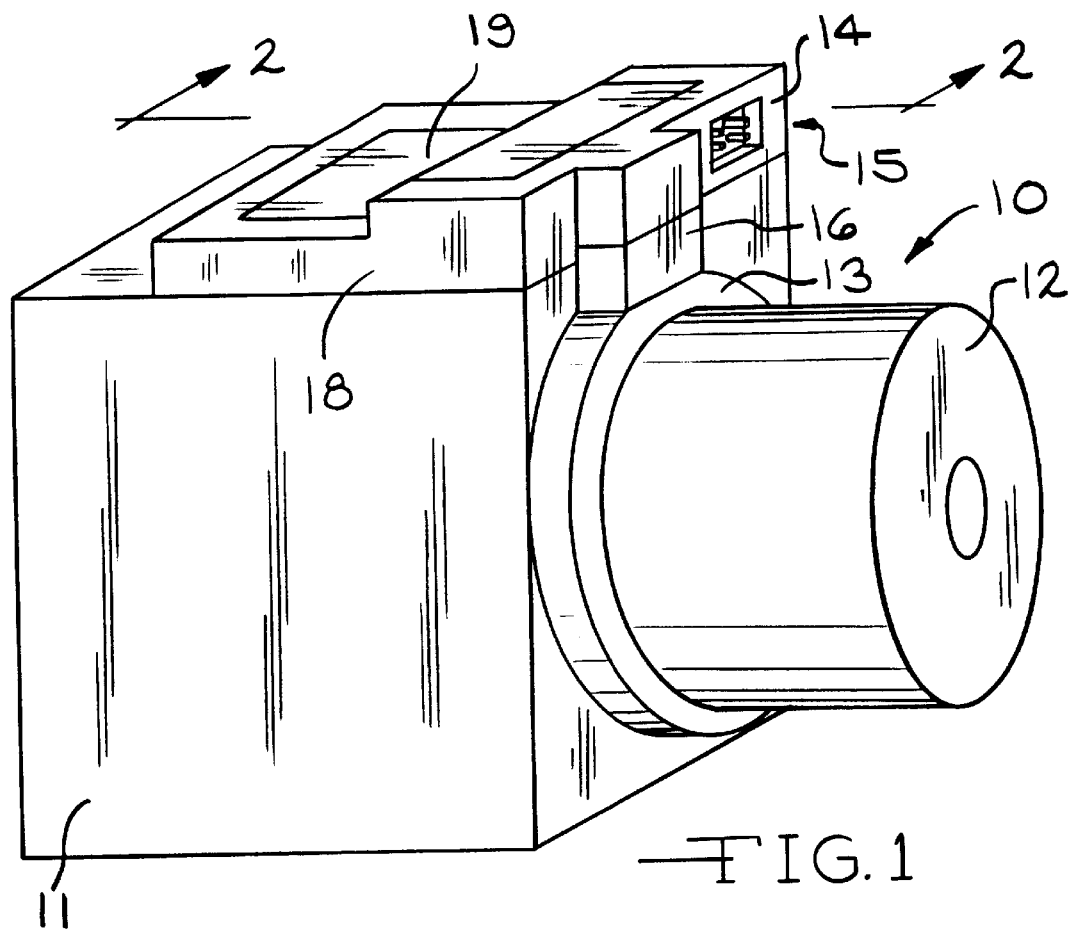
FIG. 1 is a perspective view of an ABS control valve in accordance with the invention.

Referring now to FIG. 1, there is shown generally at 10 an improved ABS control valve in accordance with the invention. For simplicity, hydraulic fittings for connecting the valve 10 to vehicle brake components have been omitted from FIG. 1. The control valve 10 includes a control valve body 11 which has a plurality of solenoid valves (not shown) and a hydraulic pump (not shown) mounted therein. An electric pump motor 12 is retained upon the side of the valve body 11 by a mounting flange 13. The motor 12 has a shaft (not shown) which extends into the valve body 11 to drive the hydraulic pump. An electronic control module 14 is mounted upon the top surface of the valve body 11. The control module 14 includes logic circuitry and electronic switching devices for actuating the solenoid valves in the valve body 11 and the pump motor 12. A first electrical connector 15 is formed in one side of the control module 14 to provide an electrical interface with other ABS components, such as speed sensors (not shown). A second electrical connector 16 extends from the control module 14 to the mounting flange 13 to provide an electrical interface with the pump motor 12.

Figure 2:
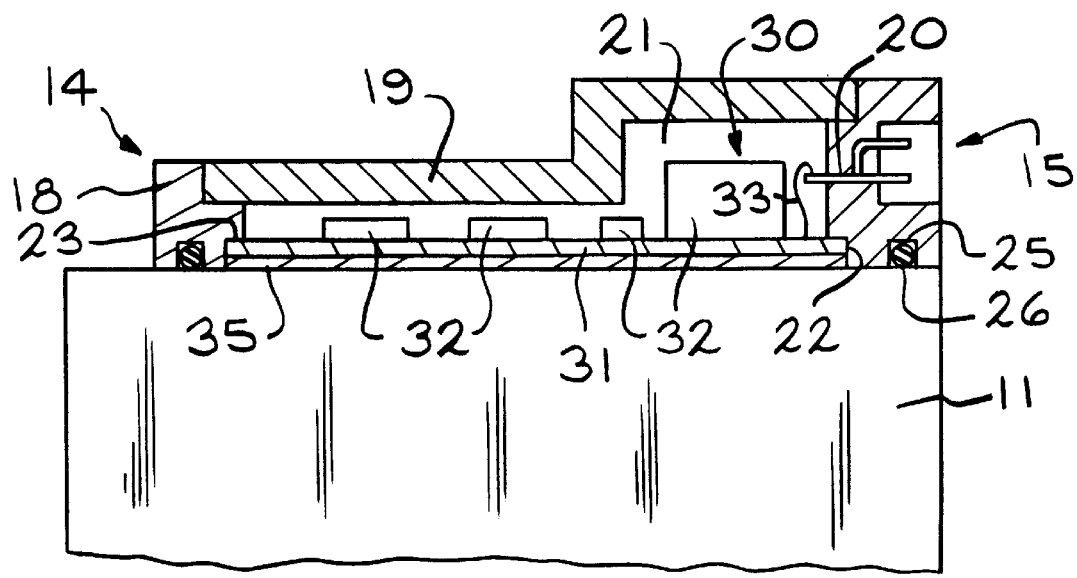
FIG. 2 is a fragmented sectional view taken along the line 2—2 in FIG. 1 which illustrates the structure of an electronic control unit.

A sectional view of the control module 14 is shown in FIG. 2. For clarity, the solenoid valves and hydraulic pump are not shown in FIGS. 2 through 4 and the pump motor 12 has been omitted from FIGS. 2 and 3. The module 14 has a housing 18 which, in the preferred embodiment, is formed from a plastic by a conventional injection molding process; however, other materials can be used to form the housing 18. The housing 18 includes a cover 19 which allows access to the housing interior. The housing 18 is molded over a connector lead frame 20. The housing 18 is attached to the valve body 11 by conventional devices (not shown), such as threaded fasteners, and cooperates with the valve body 11 to define a chamber 21.

A circumferential recess 22 is formed around the base of the inner surface of the housing 18. The recess defines a horizontal shoulder 23, the purpose for which will be explained below. The housing 18 further has a circumferential channel 25 formed in the bottom surface of the base thereof. A resilient sealing ring 26, such as a neoprene O-ring, is disposed in the channel 25 to form a seal between the housing 18 and the valve body 11. While a sealing ring 26 is shown in FIG. 2, it will be appreciated that a seal can be overmolded (not shown) into the channel 25 with a thermoset or thermoplastic material or dispensed (not shown) into the channel 25. Alternately, a gasket (not shown) formed from a resilient material can be disposed between the housing 18 and the top surface of the valve body 11. When a gasket forms the seal, the channel 25 can be omitted.

An electronic control circuit 30 is disposed within the control module chamber 21. The control circuit 30 includes a circuit substrate 31 which can be formed from a ceramic material or can be a laminated PCB. A plurality of electronic components 32 are mounted upon the substrate 31. The electronic components 32 include logic circuits, which can be included in a microprocessor, for monitoring the speeds of the controlled wheels and switching devices for actuating the solenoid valves and the pump motor 12. Logic devices for operation of an AC motor could also be mounted upon the substrate 31. The electronic components 32 are connected by conductive traces (not shown) formed upon the upper surface of the substrate 31. A plurality of wire bonds 33 electrically connect the overmolded lead frame 20 to the electrical traces to provide an electrical connection for transmission of power and signals between the electronic components 32 and the first and second electrical connectors 15 and 16. While wire bonds 33 are shown in FIG. 2, it will be appreciated that other conventional connectors can be used, such as for example, soldering or resistance welding the lead frame to the conductive traces.

In the preferred embodiment, a layer of resilient thermally conductive material 35, such as a layer of an adhesive or a grease, an elastomeric pad, a sheet of pre-preg, a layer of fiberglas epoxy laminate, a sheet of a self-adhesive elastomer, or other conventional materials, can be disposed between the substrate 31 and the valve body 11 to insure contact between the entire lower surface of the substrate 31 and the top surface of the valve body 11. When the layer 35 includes an adhesive, the adhesive functions to secure the substrate 31 to the valve body 11. The thermally conductive material 35 enhances the thermal interface between the substrate 31 and the valve body 11.

The edges of the substrate 31 and thermally conductive material 35 are received by the housing recess 22. The recess shoulder 23 cooperates with the substrate edges to urge the lower surface of the substrate 31 and the thermally conductive material 35 against the top surface of the valve body 11, forming a thermal interface therebetween. Additionally, a plurality of posts (not shown) can be formed extending downwardly from the bottom surface of the housing cover 19. The bottom end of the posts contact the upper surface of the substrate 31 to urge the adjacent area of the substrate 31 and thermally conductive material 35 against the valve body 11. Thus, the posts assure maximum cooling of specific portions of the substrate.

The valve body 11 is typically die cast from aluminum. Generally, the coefficient of thermal expansion (CTE) of the valve body 11 is greater than the CTE of the circuit substrate 31. The difference of the CTE's causes generation of thermomechanical strains in the control module since the valve body 11 can expand and contract more than the circuit substrate 31 in response to temperature variations. Accordingly, the thermally conductive material 35 which forms the interface between the circuit substrate 31 to the valve body 11 is selected to accommodate the different CTE's and is thick enough to absorb the thermomechanical strains. If conductive traces are formed upon the lower surface of the substrate 31, a thermally conductive material is selected which also is an electrical insulator to electrically isolate the conductive traces from the valve body 11. The electric insulation precludes the valve body 11 from forming a short-circuit path for the electronic components.

If the mass of the valve body 11 is sufficiently large to dissipate the heat generated by the control circuit 30 without excessive expansion, it may be possible to omit the thermally conductive material 35. Thus, inclusion of the material 35 is optional. However, when the layer of thermally conductive material 35 is omitted, the lower surface of the substrate 31 is urged directly against the upper surface of the valve body 11. Accordingly, electrical isolation is included between any conductive traces formed on the lower surface of the substrate 31 and the valve body 11 to assure that the valve body 11 does not form a short-circuit path for the electronic components.

When the control module circuit 30 is operative during anti-lock brake cycles, the heat generated by the electronic components 32 is transmitted through the substrate 31 and the thermally conductive material 35 to the valve body 11 where the heat is dissipated within the valve body mass. Thus, the valve body 11 functions as a heat sink for the electronic components 32 and a separate heat sink is not needed for the control circuit components 32. This simplifies the fabrication of the control valve 10 while lowering the manufacturing cost.

While the preferred embodiment is illustrated as including a resilient sealing ring 26, it will appreciated that the invention also can be practiced without a sealing ring 26. When the sealing ring 26 is omitted, the control circuit 30 can optionally be encapsulated to protect the circuit components 32 from environmental contamination. Also, while the second connector 16 is shown formed integrally with the mounting flange 13, it will be further appreciated that a pig tail connector (not shown) can alternately be used to connect the motor 12 to the control module 14.

It also will be appreciated that the assembly of the electronic components 32 to the substrate 31 can take many forms. Multi or single chip hybrid circuits using ceramic substrate or printed circuit board (PCB) laminate technology could be used. Discretely packaged leaded or surface mounted electronic components could also be used with either circuit interconnect technology. The use of plastic or metallic spring clips residing in the control module housing 20 and leaded discrete components is another possibility. Spring clips (not shown) also could be used in lieu of the shoulder 23 to urge the substrate 31 against the surface of the valve body 11.

Figure 3:
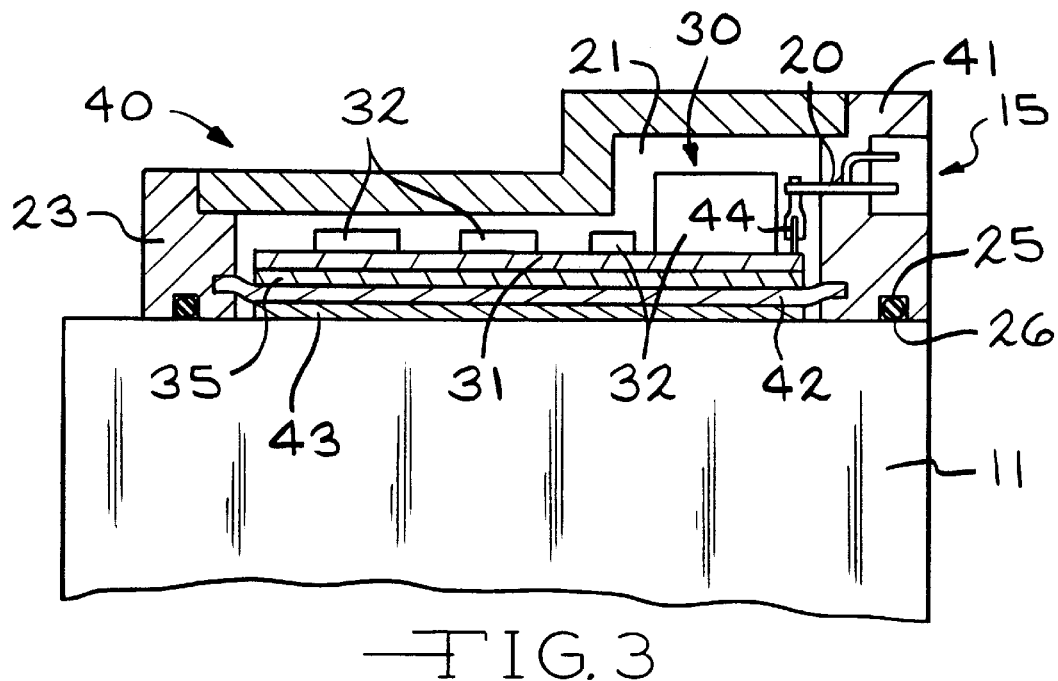
FIG. 3 is an alternate embodiment of the electronic control unit structure shown in FIG. 2.

The present invention also contemplates an alternate embodiment which is illustrated generally at 40 in FIG. 3. Components shown in FIG. 3 which are similar to components shown in FIG. 2 are identified by the same numerical designators. The alternate embodiment 40 includes a housing 41 overmolded over a lead frame 20 and a spreader 42 which carries the circuit substrate. The spreader 42, which can include a heat sink, is formed from a heat conductive material, such as, for example, aluminum, steel, copper or a metal matrix composite. A first layer of thermally conductive material 35 is disposed between the substrate 31 and the spreader 42 while a second layer 43 of thermally conductive material is disposed between the spreader 42 and the top surface of the valve body 11. The thermally conductive material can include an adhesive, grease or elastomeric pad. The spreader 42 enhances thermal performance at the valve body to module housing thermal interface while improving structural rigidity.

A plurality of blind connectors, such as bayonet connectors 44 shown in FIG. 3, connect the lead frame 20 to the conductive traces formed upon the top surface of the substrate 31. Alternatively, wire bonds (not shown) can be used to form the connection. Similarly, blind connectors can be used to connect the leadframe 20 to the conductive traces in the embodiment shown in FIG. 2.

While the preferred embodiments have been shown in FIGS. 1 through 3 have the electronic control module 14 mounted upon the top surface of the valve body 11, it will be appreciated that the invention also can be practiced with the control module 14 mounted upon other valve body surfaces, such as, for example, a side surface.

As described above, the pump motor 12 typically draws large currents during ABS braking cycles and the pump motor switching devices typically comprise the greatest source of heat in the control module 14 which must be dissipated by the control module heat sink. Accordingly, the present invention further contemplates removal of the motor control electronic components from the control module housing 18 to the motor mounting flange 13.

Figure 4:
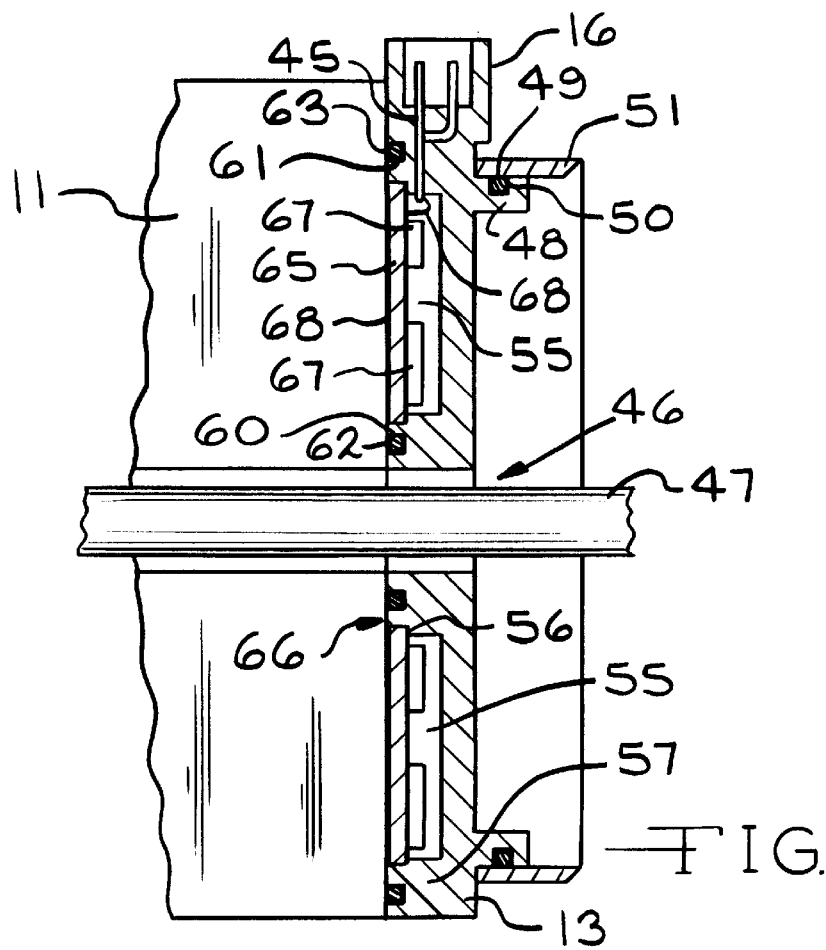
FIG. 4 is a sectional view of the motor flange shown in FIG. 1.

A sectional view of the motor mounting flange 13 is shown in FIG. 4. Components shown in FIG. 4 which are similar to components shown in FIGS. 1 and 2 are identified by the same numerical designators. For simplicity, the control module 14 has been omitted from FIG. 4. The mounting flange 13 has a generally circular shape and, in the preferred embodiment, is formed from a plastic by an injection molding process; however, other materials, such as aluminum, can be used to form the flange 13. In the preferred embodiment, the flange 13 is molded over a connector lead frame 45. An arpeture 46 is formed through the center of the flange 13. A motor shaft 47 passes through the aperture 46 and into the valve body 11 to drive the hydraulic pump (not shown).

An annular rib 48 extends axially from the right face of the flange 13. A circumferential groove 49 formed in the outer surface of the rib 48 receives a resilient sealing ring 50, such as a neoprene O-ring. As shown in FIG. 4, an open end of a motor housing 51 extends over the rib 48 and cooperates with the sealing ring 20 to form a seal between the motor housing 51 and the mounting flange 13. Alternately, a seal can be overmolded or dispensed (not shown) onto the surface of the rib 48 or a gasket (not shown) can be disposed between the mounting flange 13 and the end of the motor housing 51. The motor 12 is secured to the flange 13 by a conventional method, such as a plurality of threaded fasteners (not shown). The threaded fasteners can extend through the mounting flange 13 and into the valve body 11 to secure both the motor 13 and the flange 14 to the valve body 11.

An annular recess 55 is formed in the left face of the flange 13. The recess 55 can be continuous, or segmented by radially extending walls (not shown). Inner and outer shoulders, 56 and 57, respectively are formed in the recess 55. The purpose for the shoulders 56 and 57 will be explained below. Inner and outer circumferential grooves, 60 and 61, respectively, also are formed in left face of the flange 13. The grooves 60 and 61 receive resilient sealing rings, such as neoprene O-rings, 62 and 63. The sealing rings 62 and 63 cooperate with the flange 13 and surface of the valve body 11 to seal the recess 55 from contamination. While O-rings 62 and 63 have been shown in FIG. 4, it will be appreciated that the a seal also can be overmolded or dispensed (not shown) in the left face of the flange 13. Alternately a gasket (not shown) formed from a resilient material can be disposed between the flange 13 and valve body 11, in which case the circumferential grooves 60 and 61 can be omitted.

The shoulders 56 and 57 support a disc-shaped circuit substrate 65 which can be formed from a ceramic material or can be a laminated PCB. The disc shape of the circuit substrate 65 fits within the available shape of the recess 55; however, a smaller substrate (not shown) having a different shape can be used if desired. As shown in FIG. 4, an aperture 66 is formed through the center of the substrate 65. The aperture 66 receives the motor shaft 47 and a portion of the flange 13.

Motor control electronic components 67 are mounted upon the substrate 65 for controlling the motor 12. Logic devices for operation of an AC motor could also be mounted upon the substrate 65. The electronic components 67 are electrically connected by conductive traces formed on the surface of the substrate 65. As shown in FIG. 4, the lead frame 45 is connected to the conductive traces by a plurality of wire bonds 68; however, other conventional connectors, such as, for example, the blind connection described above, can be used between the lead frame 45 and the conductive traces. The shoulders 56 and 57 function to press the surface of the substrate 65 against the surface of the valve body 11 to form a thermal interface therebetween. Additionally, the flange 13 can include a plurality of posts (not shown) which extend across the recess 55 and against the surface of the substrate 65 to urge the adjacent portions of the substrate 65 against the valve body 11.

Similar to the structure described above, a layer of resilient thermally conductive material 68, such as a layer of an adhesive or a grease, an elastomeric pad, a sheet of pre-preg, a layer of fiberglas epoxy laminate, a sheet of a self-adhesive elastomer, or other conventional materials, can be disposed between the substrate 65 and the valve body 11 to insure contact between the entire surface of the substrate 65 and the surface of the valve body 11. When the layer 68 includes an adhesive, the adhesive functions to secure the substrate 65 to the valve body 11. The thermally conductive material 68 enhances the thermal interface between the substrate 65 and the valve body 11 while absorbing potential thermomechanical strains.

If the mass of the valve body 11 is sufficiently large to dissipate the heat generated by the electronic components 67 without excessive expansion, it may be possible to omit the material 68. Accordingly, inclusion of the material 68 is optional. When the layer of thermally conductive material 68 is omitted, the surface of the substrate 65 is urged directly against the surface of the valve body 11. Additionally, electrical isolation is included between any conductive traces formed on the lower surface of the substrate 31 and the valve body 11 to assure that the valve body 11 does not form a short-circuit path for the electronic components.

When the motor 12 is operated during anti-lock brake cycles, the heat generated by the electronic motor control components 67 is transmitted through the substrate 65 and the thermally conductive material 68 to the valve body 11 where the heat is dissipated within the valve body mass. Thus, the valve body 11 functions as a heat sink for the motor control electronic components 67. The removal of the motor control electronic components 67 from the control module 14 and use of the valve body 11 as a heat sink allows reduction of the size of the control module 14.

While the preferred embodiment is illustrated as including three resilient sealing rings 50, 62 and 63, it will appreciated that the invention also can be practiced without sealing rings. When the sealing rings are omitted, the control circuit can be optionally encapsulated to protect the circuit components from environmental contamination. Additionally, sealing rings may be included for the motor 12. Also, while a connector 16 is shown formed integrally with the mounting flange 13, it will be further appreciated that a pig tail connector (not shown) can alternately be used to connect the motor control electronic components 67 to the control module 14.

It will be appreciated that the assembly of the electronic components 67 to the substrate 65 can take many forms. Multi or single chip hybrid circuits using ceramic substrate or printed circuit board (PCB) laminate technology could be used. Discretely packaged leaded or surface mounted electronic components could also be used with either circuit interconnect technology. The use of plastic or metallic spring clips residing in the motor flange and leaded discrete components is another possibility. Spring clips also could be used in lieu of the recess shoulders 56 and 57 to urge the substrate 65 against the surface of the valve body 11.

Similar to the structure illustrated in FIG. 3, the invention further contemplates insert molding a spreader (not shown) into the motor flange 13. AS described above, the spreader can include a heat sink. The spreader would carry the substrate 65 and electronic components 67 to enhance thermal performance at the valve body to motor flange thermal interface while improving structural rigidity. As shown in FIG. 3, it is further contemplated that a first layer of thermally conductive material can be disposed between the substrate 65 and the spreader and a second layer of thermally conductive material can be disposed between the spreader and the valve body 11. The spreader would be made from a heat conductive material, such as, for example, aluminum, steel, copper or a metal matrix composite.

Figure 5:
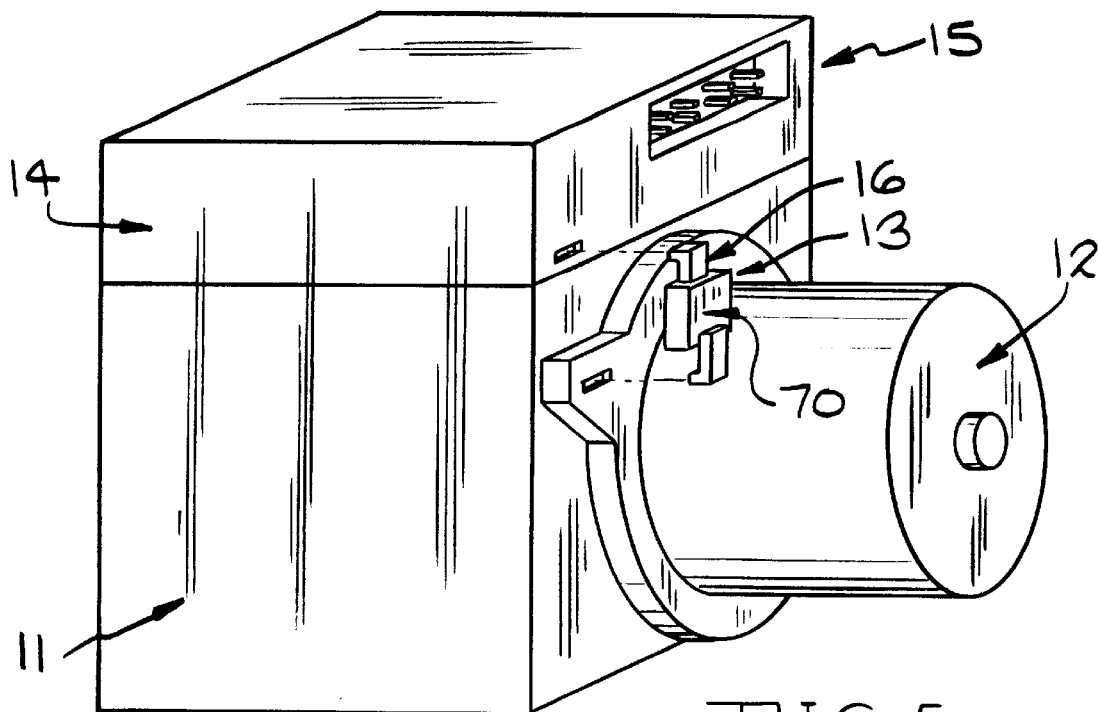
FIG. 5 is a perspective view of an alternate structure of the control module shown in FIG. 2.
Figure 6:
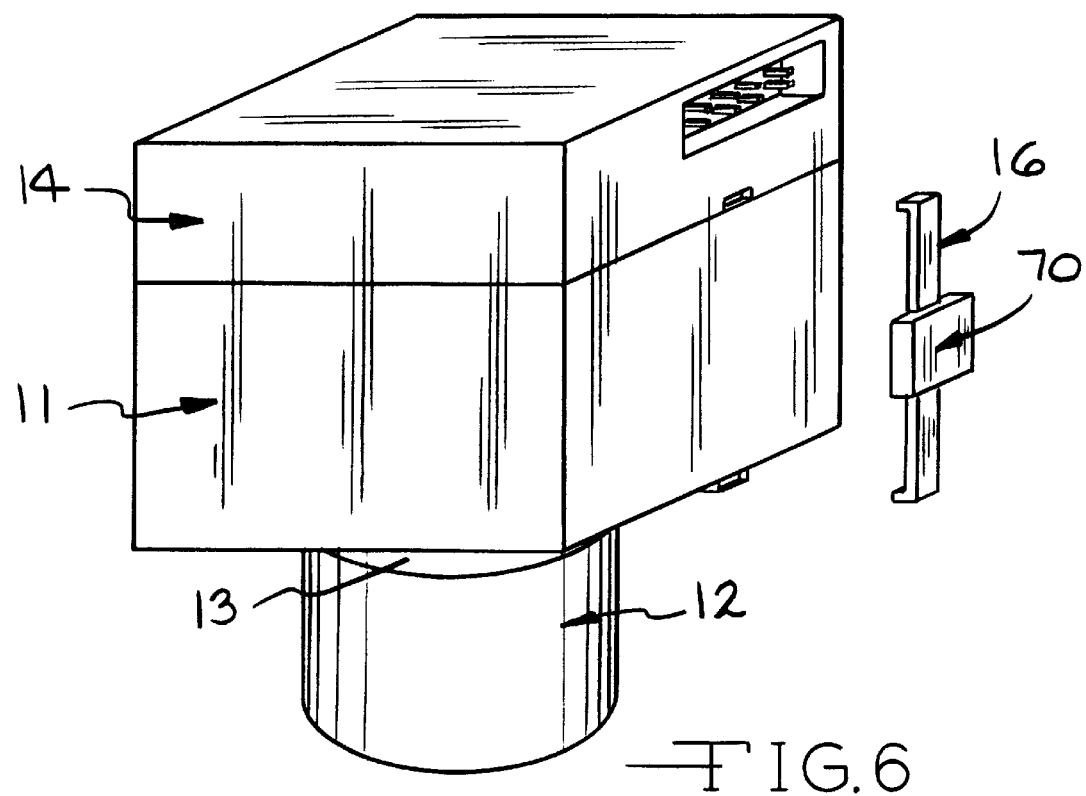
FIG. 6 is a perspective view of an another structure of the control module shown in FIG. 5.

Alternate embodiments for removal of the motor control electronic components from the control module 14 are illustrated in FIGS. 5 and 6. In FIGS. 5 and 6, components which are similar to components shown in FIGS. 1 and 2 are identified with the same numerical designators. In FIGS. 5 and 6, the motor control devices are located in a separate module 70 which is mounted upon the second electrical connector 16 externally from the motor flange 13. The motor control electronic components are retained within the module 70 with mounting structures similar to those shown in FIGS. 2 and 3 and described above to assure that a thermal interface is formed between the motor control components and the valve body 11.

While the preferred embodiment of the invention has been described and illustrated in terms of an anti-lock brake system control module, it will be appreciated that the invention also can be practiced upon other vehicular control systems, such as, for example, vehicle stability and traction control electronic modules. Additionally, the invention can be applied to any hydraulic valve assembly, such as a master hydraulic brake cylinder, where an electric motor is used to enhance brake system control. Furthermore, coil integrated or remote ABS electronic modules can benefit from this invention. It also will be appreciated that, while the invention has been described as providing a heat sink for motor switching components, the invention also can be practiced to provide a heat sink for solenoid coil switching components and other electronic components included in an ABS control module.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A control valve for a hydraulic control system including;

a control valve body which includes at least one internal passageway and at least one solenoid valve, said internal passageway adapted to be connected to the hydraulic control system and said solenoid valve communicating with said passageway and operative to control the flow of hydraulic fluid within the hydraulic control system, said control valve body also including an exterior surface; and a control circuit substrate disposed adjacent to said exterior surface of said control valve body, said substrate carrying electronic components adapted to control components of the hydraulic control system, said substrate forming a thermal interface with said exterior surface of said valve body such that said valve body functions as a heat sink for said electronic components.

2. A control valve according to claim 1 further including a layer of a thermally conductive material disposed between said circuit substrate and said valve body.

3. A control valve according to claim 2 further including a housing mounted upon said valve body, said housing having a recess formed therein which receives said substrate, said housing cooperating with said substrate to urge said substrate and said layer of thermally conductive material against said valve body surface.

4. A control valve according to claim 3 wherein said housing is an electronic control module housing.

5. A control valve according to claim 3 wherein said housing is a mounting flange for a motor which is mounted upon said valve body.

6. A control valve according to claim 5 wherein said electronic components control operation of said motor.

7. A control valve according to claim 3 further including a motor and an electronic control module mounted upon said valve body, said housing being separate from said electric control module and said motor, said housing mounted upon said valve body between said motor and said control module, said electronic components carried upon said substrate within said housing electrically coupling said control module to said motor and controlling the operation of said motor.

8. A control valve according to claim 1 further including a housing mounted upon said valve body, said housing having a recess formed therein which receives said substrate, said housing cooperating with said substrate to urge said substrate against said valve body surface.

9. A control valve a hydraulic control system including;

a control valve body having an exterior surface;

a control circuit substrate disposed adjacent to said exterior surface of said control valve body, said substrate carrying electronic components adapted to control a motor, said substrate forming a thermal interface with said exterior surface of said valve body such that said valve body functions as a heat sink for said electronic components;

a layer of a thermally conductive material disposed between said circuit substrate and said control valve body;

a motor having a mounting flange mounted upon said valve body, said motor mounting flange having a recess formed therein which receives said substrate, said motor mounting flange cooperating with said substrate to urge said substrate and said layer of thermally conductive material against said valve body surface; and a lead frame molded into said motor mounting flange, said lead frame electrically coupled to said electronic components mounted upon said substrate.

10. A control valve according to claim 9 further including a spreader molded into said motor flange, said spreader carrying said substrate.

11. A control valve according to claim 10 wherein said spreader includes a heat sink.

12. A control valve according to claim 11 further including a first layer of thermally conductive material disposed between said substrate and said spreader and a second layer of resilient material disposed between said spreader and said valve body surface.

13. A control valve for a hydraulic control system including;

a control valve body having an exterior surface;

a control circuit substrate disposed adjacent to said exterior surface of said control valve body, said substrate carrying electronic components adapted to control components of the hydraulic control system, said substrate forming a thermal interface with said exterior surface of said valve body such that said valve body functions as a heat sink for said electronic components;

an electronic control module housing mounted upon said valve body, said housing having a recess formed therein which receives said substrate, said housing cooperating with said substrate to urge said substrate and said layer of thermally conductive material against said valve body surface; and a lead frame molded into said control module housing, said lead frame electrically coupled to said electronic components mounted upon said substrate.

14. A control valve according to claim 13 further including a spreader molded into said control module housing, said spreader carrying said substrate.

15. A control valve according to claim 14 wherein said spreader includes a heat sink.

16. A control valve according to claim 15 further including a first layer of thermally conductive material disposed between said substrate and said spreader and a second layer of resilient material disposed between said spreader and said valve body surface.

17. A control valve according to claim 15 wherein the control valve is included in an anti-lock brake control system.

18. A control valve according to claim 15 wherein the control valve is included in a traction control system.

* * * * *